United States Patent Office 3,551,368
Patented Dec. 29, 1970

3,551,368
METAL PRIMERS COMPRISING PARTIAL FATTY ACID ESTERS OF STYRENE-ALLYL ALCOHOL COPOLYMERS AND ADIPIC ACID
Atam P. Sahni, Springfield, Mass., assignor to Monsanto Company, St. Louis, Mo., a corporation of Delaware
No Drawing. Filed Aug. 18, 1967, Ser. No. 661,512
Int. Cl. C09d 3/74, 5/08, 5/10
U.S. Cl. 260—23
9 Claims

ABSTRACT OF THE DISCLOSURE

Disclosed herein is a primer for metal surfaces which may be applied to surfaces which have not been previously cleaned of oxidation products; greasy, oily contaminants; or drawing compound. The coating is based upon a blend of adipic acid, polyvinyl butyral and the esterification product of the reaction between a styrene-allyl alcohol copolymer and an unsaturated fatty acid containing 10–24 carbon atoms. The coating may also contain chromium trioxide to enhance corrosion resistance and may further contain aluminum powder and zinc dust to impart weldability. The procedure necessary for the preparation of the coating is also disclosed.

BACKGROUND OF THE INVENTION

(1) Field of the invention

This invention relates to primers for application to metal surfaces. In particular, these primers may be applied to surfaces which have not undergone a prior cleaning step to remove drawing compound and other surface contaminants. Further, when properly formulated, these primers greatly improve the resistance to corrosion of the underlying metal substrates and may be left in place when the metal is subsequently welded.

(2) Description of the prior art

As is well known, when steel or other metals emerge from the mill, they are covered with greasy or oily substances which serve to reduce damage brought about by friction and also to retard the onset of oxidation. Where such metals are to be subsequently cold-drawn, they have applied to their surfaces a drawing compound which provides a tough film of wax for protection of the surface during the drawing operation. This drawing compound is a substance which is applied to the metal surfaces to prevent pickup and scoring during drawing or pressing operations by preventing metal-to-metal contact of the work piece and die. It is an ordinary wax applied in aqueous emulsion form.

Previously, in order to form a more perfect bond between the metallic substrate and any coating to be applied thereto, it has been necessary to remove such surface contaminants by various means such as chemical degreasing, sand blasting, wire brushing, etc. Further, despite the use of these oily or greasy coatings, it often happens that rusting, i.e. oxidation, does occur, whereupon such rust must also be removed prior to further coating.

Therefore a need has existed for a primer which can be appleid to surfaces which have undergone no prior cleaning procedure to remove contaminants or drawing compound and which may be formulated to give excellent protection from corrosion. A need also exists for a primer which can be formulated to conduct an electric welding arc, such that the metal work piece can be welded without the prior removal of the aforesaid primer.

SUMMARY OF THE INVENTION

It is an object of this invention to provide a primer which will adhere to metals which have not undergone any prior cleaning step to remove the products of oxidation or greasy or oily contaminants or drawing compound.

It is a further object of this invention to provide a weldable, anti-corrosive primer for metal which does not require removal before welding.

Another object of this inventoin is to provide a primer for metal which need not be removed before additional priming and top coating of the metal.

These and other objects are attained by providing a primer vehicle based upon adipic acid, polyvinyl butyral and an ester formed by the reaction of a copolymer of styrene and allyl alcohol with an unsaturated fatty acid having 10–24 carbon atoms.

More particularly, this invention relates to a primer which comprises: (A) a polymeric blend consisting essentially of (1) about 20 to 80% by weight polyvinyl butyral and, correspondingly, (2) about 80 to about 20% by weight of a fatty acid ester of a copolymer of an ethylenically unsaturated alcohol and a styrene monomer, said esterified copolymer being a copolymer of: (a) an ethylenically unsaturated alcohol selected from the group consisting of allyl alcohol, methallyl alcohol and mixtures thereof, and (b) a styrene monomer selected from the group consisting of styrene, ring-substituted mono- and di-, alkyl-, chloro- and chloroalkyl styrene and mixtures thereof, wherein said copolymer, before esterification has a hydroxyl group content of from about 4–7.5% by weight; from 50–75% of said hydroxyl groups being esterified with fatty acid selected from the group consisting of unsaturated fatty acid containing from 10–24 carbon atoms and mixtures thereof as obtained from the hydrolysis of drying and semi-drying oils; and (B) about 2.5% to about 25% by weight adipic acid, based on the weight of the resin solids.

The use of the adipic acid is critical to the invention in that it enables the primer to adhere to metallic surfaces which are coated with drawing compound and at the same time does not react with the metallic substrate or metal pigments when present, creating serious gassing or etching problems, as other acids do.

To this vehicle may also be added, if desired, about 0.5% to about 3% by weight chromium trioxide, based on the amount of the polyvinyl butyral. It has been found that the presence of chromium trioxide improves the corrosion resistance of the coating.

Where a weldable primer is desired, from 10% to about 50% by weight of aluminum powder of less than 100 mesh, based on the weight of the total resin may be added to the above described vehicle. In addition to this, zinc dust, between 200 mesh and 325 mesh, may be added further to enhance the weldability of the primer.

DESCRIPTION OF THE PREFERRED EMBODIMENTS

The polyvinyl butyral resin employed in the practice of this invention may have a vinyl alcohol content of from 5 to 30 weight percent and a residual acetate content of less than 10 weight percent, based on the total resin weight. Especially preferred are polyvinyl butyrals with a vinyl alcohol content of from 14 to 22% and a residual acetate content of from 1.0 to 5.0%. The weight average molecular weight of the polyvinyl butyral may vary from 25,000 to 250,000 with a preferred range of 25,000 to 50,000.

The esterified copolymers of this invention are copolymers of from 60–85% by weight of a styrene monomer and, correspondingly, from 40 to 15% by weight of an ethylenically unsaturated alcohol wherein from 50 to 75% of the hydroxyl groups thereof are esterified with an unsaturated fatty acid. The actual hydroxyl group content of the aforesaid polymers (before esterification) will not always conform to the theoretical content calculated from the relative proportions of styrene monomer and ethylenically unsaturated alcohol, due to possible destruction of hydroxyl groups during copolymerization. In general, however, copolymers containing from about 4.0 to 7.5% hydroxyl groups by weight are within the scope of this invention. The styrene monomer moiety of said copolymer may be styrene or a ring-substituted styrene in which the substituents are 1–4 carbon atom alkyl groups or chlorine atoms. Examples of such ring-substituted styrenes include the ortho-, meta- and para-, methyl, ethyl, butyl, etc. monoalkyl styrenes; 2,3–2,4-dimethyl and diethyl styrenes; mono-, di- and tri-chlorostyrenes; alkyl chlorostyrenes such as 2-methyl-4-chlorostyrene, etc. Mixtures of 2 or more of such styrene monomer moieties may be present. The ethylenically unsaturated alcohol moiety may be allyl alcohol, methylallyl alcohol, or a mixture thereof. For the purposes of brevity and simplicity of discussion, the entire class of copolymers set forth in this paragraph shall hereinafter be referred to as styrene-allyl alcohol copolymers.

The styrene-allyl alcohol copolymers may be prepared in several ways. (See, for example, U.S. 2,940,946.) It is most desirable to copolymerize the styrene and allyl alcohol components in a substantially oxygen-free system, thus minimizing the oxidative loss of hydroxyl groups (see U.S. 2,894,938).

The unsaturated fatty acids with which the aforementioned styrene-allyl alcohol copolymers are esterified are those containing from 10–24 carbon atoms. Examples of suitably unsaturated fatty acids include $\Delta^{9,10}$ decylenic acid, $\Delta^{9,10}$ dodecylenic acid, palmitoleic acid, oleic acid, ricinoleic acid, petroselinic acid, vaccenic acid, linoleic acid, linolenic aid, eleostearic acid, licanic acid, parinaric acid, tariric acid, gadoleic acid, arachidonic acid, cetoleic acid, erucic acid, selacholeic acid, etc. Mixtures of such fatty acids may also be employed. Especially preferred are the mixtures of such unsaturated fatty acids as tall oil fatty acids, and as are obtained by the hydrolysis of drying and semi-drying oils such as acorn oil, beechnut oil, brazil nut oil, chaulmoogra oil, corn oil, cotton seed oil, croton oil, hemp seed oil, linseed oil, oiticica oil, perilla oil, poppy seed oil, sesame oil, soybean oil, safflower oil, sunflower oil, tung oil, walnut oil, dehydrated castor oil, etc.

The esterified resins are prepared by co-reacting an unsaturated fatty acid and a styrene-allyl alcohol copolymer until from 50–75% of the hydroxyl groups of the copolymer are esterified. This may be accomplished by employing a proportion of unsaturated fatty acid substantially stoichiometrically equivalent to the proportion of hydroxyl groups desired to be esterified. The necessary proportions may be readily determined by a chemist from quantitative analysis data expressed in milliequivalents of carboxyl and hydroxyl groups per unit weight of unsaturated fatty acid and styrene-allyl alcohol copolymer, respectively.

The esterification reaction, in detail, may be effected to the desired degree of esterification at temperatures of from 160° C. to about 225° C. without significant destruction of hydroxyl groups. However, prolonged heating at higher temperatures is apt to result in a loss of hydroxyl groups from the copolymer. Thus, it is preferred to avoid the use of reaction temperatures above about 225° C. although temperatures of up to about 325° C. may be employed if desired. The reaction may be terminated short of completion merely by ceasing to heat, by quenching, or by other conventional techniques. The esterification may be conducted in the presence of an inert hydrocarbon solvent such as xylene, mineral spirits, etc. However, the use of solvent is optional since the esterification proceeds satisfactorily in the absence of solvent.

The polyvinyl butyral and the esterified styrene-allyl alcohol copolymer may be advantageously blended in weight ratios of from 80/20 to 20/80, inclusive. For optimum adhesion, workability, impact resistance and resistance to salt water and salt spray, it is preferred that the esterified styrene-allyl alcohol portion account for 50–75% of the weight of the total resin.

Chromium trioxide may be added where good water resistance and improved corrosion protection is required.

The organic solvent employed in the practice of this invention should not be corrosive to the metal plate or react adversely with any of the other ingredients in the primer. Examples of suitable solvents include: 1/1 xylene/ethanol; 47.5/47.5/5.0 toluene/butanol/cyclohexanone; 51/34/15 toluene/butanol/ethylene glycomonomethyl ether; 1/1 isopropanol/toluene. Especially preferred is a solvent blend of 1/1 toluene/n-butanol.

Where aluminum powder is employed in the practice of this invention, it should be less than 100 mesh in order to ensure good dispersion throughout the resin solution. The aluminum serves as a conductive coating through which an arc can be struck and serves to make the primer weldable. It also functions as a good deoxidizer and welding flux and aids in imparting weathering resistance to the coating.

In addition to the aluminum powder, zinc dust in the range of from about 200 mesh to about 325 mesh may be added. The presence of the zinc enhances the ability of the primer film to conduct the electric welding arc. If the particles are substantially larger than 200 mesh, the film will have a coarse texture; if smaller than 325 mesh, it becomes less likely that the particles can form a continuous bridge through the film to conduct the current.

The invention disclosed herein lies in the inclusion of adipic acid in the primer vehicle formulation. In the absence of the adipic acid, the adhesion of the primer film to a metal surface having drawing compound deposited thereon will be insufficient to have practical utility. Of course, it will be understood that the primers of this invention adhere well to clean surfaces; that is to say, having drawing compound on the substrate surface is not essential to good adhesion, but rather, these primers will adhere in spite of the presence of the drawing compound. It is contemplated that the adipic acid will be used in a concentration of from about 2.5% by weight to about 25% based upon the resin. Below 2.5%, adhesion has been found to be inadequate; above 25%, the acid exerts an adverse effect upon the corrosion resistance of the primer. A concentration of about 5% by weight is preferred.

It is not solely the propensity of the adipic acid to promote adhesion that makes it critical to this invention, however; there are a number of other acids which would accomplish this. Experimentation has shown, however, that these other acids, e.g., phosphoric, maleic, acetic, etc., cause hydrogen gas to be emitted when they come in contact with the metals used in the contemplated applications. This "gassing" is undesirable for at least three reasons: (1) the build-up of hydrogen gas as the primer stands on the shelf is a safety hazard, (2) the bubbles can cause pin holes in the primer film and (3) the salts which are formed by the reaction diminish the ability of the primer to resist corrosion. Adipic acid is the only acid that has been found that combines adhesion improvement with disinclination toward gassing.

The following examples are presented in illustration of the invention and are not intend as limitations thereof. Where parts are mentioned, parts by weight are intended unless otherwise described.

EXAMPLE I

Part A

A 1-liter flask is equipped with a stirrer, a thermometer, a water condenser and a trap filled with xylene. 300 grams of a copolymer comprised of about 70% by weight of styrene and, correspondingly, a theoretical 30% by weight of allyl alcohol, but having an actual hydroxyl group content of about 6.4% by weight, are charged thereto together with 240 grams of soya fatty acids and 30 grams of xylene. The mixture is gradually heated to reflux (to about 160° C.) and then to about 225° C. over a period of 1 hour and is maintained thereat for an additional hour. About 30 milliliters, of mixed water and xylene are removed from the trap. The batch temperature is then increased, over a 45 minute period, to about 300° C. and is maintained thereat for an additional two hours. A fused esterified resin wherein approximately 75% of the hydroxyl groups have been esterified, is obtained in conjunction with sufficient free soya fatty acid to provide an acid number of about 3.

Part B 100 parts of the product of Part A is added to a mixing kettle containing 400 parts of n-butanol and 400 parts of toluene. This addition is carried out under agitation of moderate intensity, and the agitation is continued throughout the process. 100 parts of polyvinyl butyral is further added to the agitation vortex. After a short time, both resins dissolved in the solvent mixture.

EXAMPLE II

To 100 parts of the solution prepared in Example I, Part B, is added one part of adipic acid. When the acid has dissolved, the solution is sprayed onto steel test panels, to an extent sufficient to deposit a 1.3 to 1.5 film when dry. The film is found to have a good appearance and passes the following adhesion test:

(1) The test panels are baked for five minutes at 280° F. to remove any surface moisture. They are then cooled to room temperature.

(2) The primer is applied to three groups of panels as follows:

(a) clean panels,
(b) oiled panels which are prepared by daubing the surface of the panels with a paper tissue which has been soaked in oil and then, with a squeegee, forming a thin coating.
(c) oiled with drawing compound. Panels prepared as in Part (b) are coated with drawing compound by means of a doctor blade having a three mil opening.

(3) The panels are air dried for 30 minutes at about 72° F.

(4) The primer is then sprayed onto the panels.

(5) The coated panels are dried for 72 hours at 72° F.

(6) The following solutions are prepared:

(a) To ½ gallon of water is added 20 grams of an alkaline detergent, followed by the addition of sodium hydroxide until the pH is 10.0.
(b) To ½ gallon of water is added 5 grams of a common household anionic detergent. This solution is diluted with water until the pH is in the range of 6.0–8.0.
(c) 35 grams of sodium chromate is dissolved in 65 grams of water.
(d) 33 grams of chromium trioxide and 24 grams of phosphoric acid are dissolved in 43 grams of water.

(7)(A) To 1 liter of tap water is added 7 grams of the solution of 6(a) and 1.2 grams of the solution of 6(b).

(B) To a liter of tap water is added 1.25 milliliters of the solution of 6(c) and 0.5 milliliter of the solution of 6(d).

(8) The test panel is immersed in the solution of 7(A) with gentle agitation for 1 minute at a temperature of 160–170° F.

(9) The panel is rinsed in tap water of a temperature 145–155° F. for a 1 minute.

(10) The panel is immersed in the solution of 7(B) for 30 seconds under gentle agitation at a temperature of 115–125° F.

(11) The panel is dried in an oven at 250° for 6 minutes.

(12) The panel is permitted to cool to room temperature.

(13) A multi-bladed carbide tip scriber is used to make scribed lines in the coating which are ⅛ inch apart, at right angles and diagonally in one direction.

(14) Masking tape is applied over the scribe marks by pressing firmly and is then removed by an upward motion at medium speed.

(15) The coating is examined for the occurrence of chipping, flaking or general poor adhesion.

EXAMPLE III

Example II is repeated except that the adipc acid is not added. The resulting film fails to pass the adhesion test of Example II.

EXAMPLE IV

The primer prepared in Example II is tested for gassing. A portion of the primer is sealed in a 1 pint steel can for 72 hours at 60° C. At the end of this time, if gassing has occurred, a positive pressure within the can will be detectable. For the primer of Example II no pressure is detected. On the contrary, a slight vacuum is noted.

EXAMPLE V

Part A

Example IV is repeated except that acetic acid is substituted for the adipic. Again, a slight vacuum is noted indicating the absence of gassing, but it is found that this formulation fails the adhesion test of Example II.

Part B

Part A is repeated using phosphoric acid instead of the acetic. This time the film passes the adhesion test of Example II, but the primer exhibits undesirable gassing according to the test of Example IV.

Part C

Part B is repeated substituting oxalic acid for the phosphoric. The same results are observed.

EXAMPLE VI 0.2 part chromium trioxide is dissolved in 5 parts water. This is added slowly and with good agitation to 100 parts of the primer of Example II. To the resulting solution is added 4 parts of aluminum powder and 0.2 part of a 6% cobalt octoate drier. The viscosity of the resulting primer is 125 centipoises. There is no gassing as determined by the method described in Example IV. Films of this primer are sprayed on steel test panels and air dried for 55 hours. It is found they have a tensile hardness of 4B and withstand a reverse impact of greater than 160 inch lbs.

EXAMPLE VII

Example VI is repeated except that the primer contains 5 parts of adipic acid. The primer is applied to steel panels having deposited thereon a film of drawing compound. Having dried for 24 hours at room temperature, the tensile hardness is found to be slightly less than 6B and the adhesion is found to be good.

EXAMPLE VIII 1 part of adipic acid is dissolved in 100 parts of the primer solution of Example I. In a separate vessel, 0.2 part chromium trioxide is first dissolved in 0.5 ml. water and then diluted with 4.5 parts of methyl ethyl ketone. The resulting diluted solution is then added slowly and with good agitation to the aforementioned primer solution. To this is added 4 parts of aluminum powder, followed by 6 parts of zinc dust and 0.2 part of a 6% cobalt octoate drier. This primer is applied to steel panels coated with drawing compound. The coating passes the adhesion test described in Example II and exhibits slight gassing by the test of Example IV. The panels are placed in a salt-fog cabinet for 10 days, after which it is found that the adhesion is fair and that there is no blistering or undercutting.

It is obvious, of course, that various additives such as pigments, dyes, fillers, extenders, wetting agents, and the like, may be added to the composition without departing from the scope of the invention. In particular, the use of titanium dioxide as a pigment in these formulations has been found to be beneficial in some applications.

Although the examples have mentioned the application of these primers, only to steel substrates, it should be pointed out the invention is not limited in this regard. In particular, these formulations have been found to adhere readily to galvanized steel, and may be expected to adhere also to such other metal surfaces as brass, copper, zinc, iron, stainless steel, bronze, chromium, nickel, etc.

Applications of the coatings may be accomplished by any conventional method such as brushing or dipping and are not of course, limited to spraying.

It is obvious that many variations may be made in the products and methods set forth above without departing from the spirit and scope of this invention.

What is claimed is:
1. A primer comprising
   (A) a polymeric blend consisting essentially of
      (1) about 20 to about 80% by weight of a polyvinyl butyral having a vinyl alcohol content of from 5 to 30 weight percent, a residual acetate content of less than 10 weight percent, and a weight average molecular weight of from 25,000 to 250,000, and correspondingly,
      (2) about 80 to about 20% by weight of fatty acid ester of a copolymer of an ethylenically unsaturated alcohol and a styrene monomer, said esterified copolymer being a copolymer of:
         (a) an ethylenically unsaturated alcohol selected from the group consisting of allyl alcohol, methallyl alcohol and mixtures thereof, and
         (b) a styrene monomer selected from the group consisting of styrene, ring-substituted mono- and di-, alkyl-, chloro- and chloroalkyl styrenes and mixtures thereof, wherein said copolymer before esterification, has a hydroxyl group content of from about 4-7.5% by weight; from 50-75% of said hydroxyl groups being esterified with fatty acid selected from the group consisting of unsaturated fatty acids containing from 10-24 carbon atoms and mixtures thereof as obtained from the hydrolysis of drying and semi-drying oils; and
   (B) about 2.5% to about 25% by weight of adipic acid, based on the weight of the resin solids.

2. The primer of claim 1 further containing about 0.5% to about 3% by weight chromium trioxide, based on the amount of polyvinyl butyral.

3. The primer of claim 2 further containing about 10% to about 50% by weight of aluminum powder of less than 100 mesh, based on the weight of the total resin.

4. The primer of claim 1 wherein the polymeric blend contains about 25 to about 50% by weight of polyvinyl butyral and, correspondingly, about 75% to about 50% of the fatty acid esterified copolymer.

5. The primer of claim 1 wherein the fatty acid ester of the copolymer is the soya fatty acids ester.

6. The anti-corrosive primer of claim 1 wherein the ester of the copolymer is the tall oil fatty acid ester.

7. The primer of claim 1 incorporated into at least 1 non-corrosive organic liquid which is a solvent for both components of the polymeric blend.

8. The primer of claim 7 wherein the solvent is 1/1 toluene/n-butanol, by weight.

9. The primer of claim 4 wherein the copolymer is a styrene-allyl alcohol copolymer.

References Cited

UNITED STATES PATENTS

| | | | |
|---|---|---|---|
| 3,037,955 | 6/1962 | Carman | 260—30.6 |
| 3,110,691 | 11/1963 | Fisher, Jr. | 260—22 |
| 3,272,663 | 9/1966 | Kronstein | 148—6.16 |
| 3,325,432 | 6/1967 | Kellert et al. | 260—29.6 |
| 3,339,058 | 8/1967 | Todd | 219—137 |
| 3,355,403 | 11/1967 | Hahn | 260—23 |
| 3,393,172 | 7/1968 | Breskman | 260—33.4 |
| 3,429,945 | 2/1969 | Forsberg et al. | 260—836 |

DONALD E. CZAJA, Primary Examiner

R. A. WHITE, Assistant Examiner

U.S. Cl. X.R.

106—14; 117—132; 260—33.4, 33.6, 41